Feb. 6, 1962
H. F. PRASSE
3,019,737
LEAF SPRING SEAL FOR PUMPS
Filed Feb. 12, 1960
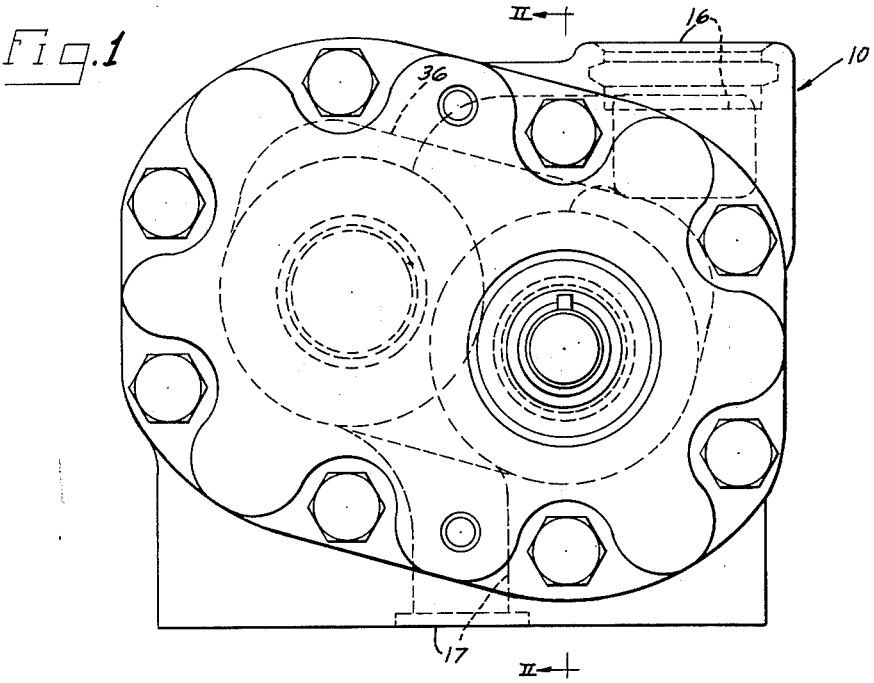
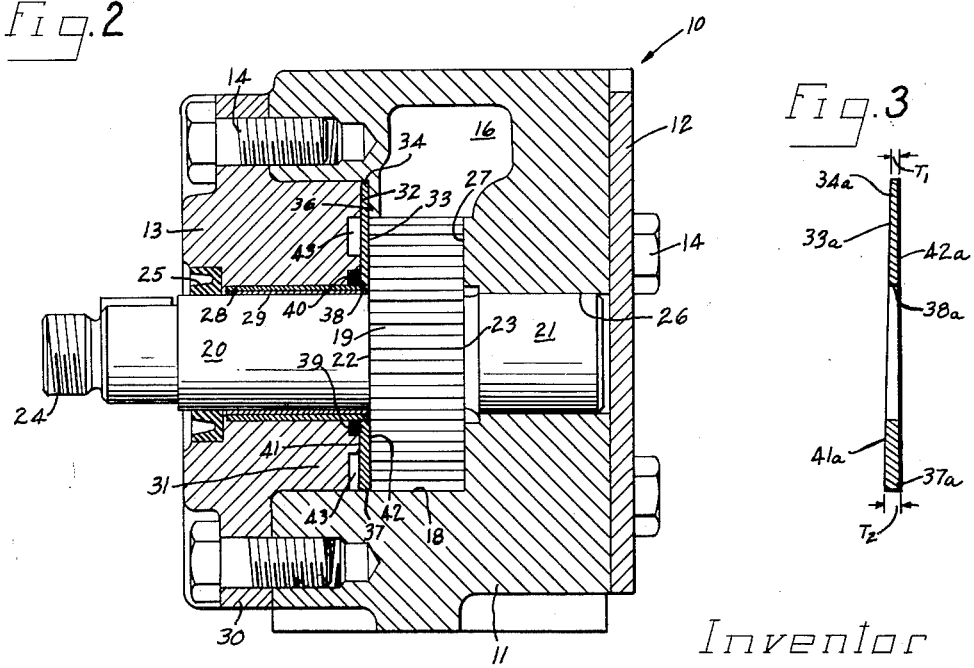
Inventor
Herbert F. Prasse
by Hill, Sherman, Meroni, Gross *Attys

United States Patent Office 3,019,737
Patented Feb. 6, 1962

3,019,737
LEAF SPRING SEAL FOR PUMPS
Herbert F. Prasse, Gates Mills, Ohio, assignor to Thompson Ramo Wooldridge Inc., Cleveland, Ohio, a corporation of Ohio
Filed Feb. 12, 1960, Ser. No. 8,440
12 Claims. (Cl. 103—126)

This invention relates generally to pumps and more particularly to an improved sealing and wear plate means for a positive displacement pump such as a pressure-loaded gear pump assembly.

It is an object of the present invention to provide an improved pressure-loaded pump which affords balanced pressure sealing without requiring the utilization of separate bushings or sleeves.

Another object of the present invention is to provide a pump wherein a plate is carried in the pump housing free to flex as a leaf spring against the side faces of the rotary fluid displacement means.

Another object of the present invention is to provide a pump housing wherein a wall portion thereof is subjected to fluid at pump-generated pressures, thereby affording a flexible seal for the gear side faces.

Many other features, advantages and additional objects of the present invention will become manifest to those versed in the art upon making reference to the detailed description which follows and the accompanying sheet of drawings in which a preferred structural embodiment of a pump incorporating the principles of the present invention is shown by way of illustrative example.

On the drawings:
FIGURE 1 is an end elevational liew of a gear pump incorporating the principles of the present invention;
FIGURE 2 is a cross-sectional view taken generally on line II—II of FIGURE 1; and
FIGURE 3 is a somewhat enlarged cross-sectional view of a sealing plate provided in accordance with the principles of the present invention.

As shown on the drawings:
The pump of the present invention is indicated generally at 10 and although the principles of the present invention are of general applicability, the particular form of pump herein described is a gear pump which includes a casing having a center body member 11 closed at one side by a closure plate 12 and closed at the opposite side by a cover member 13, suitable fastener members 14 being provided for holding the casing components together.

The pump is provided with an inlet 16 and an outlet 17 on opposite sides of a pumping cavity 18 formed in the body member 11.

A pair of gears is rotatably meshed within the pumping cavity 18 and as illustrated in FIGURE 2 in connection with the details of the driver gear, there is provided a gear hub 19 press-fit on a shaft including a first shaft extension 20 and a second shaft extension 21 extending from opposite side faces of the gear hub 19, the side faces being identified respectively at 22 and 23. The shaft extension 20 has a coupling portion 24 adapted to be connected to a suitable prime mover for rotatably driving the pump.

The body member 11 is provided with a recess forming a bearing surface 26 to journal the shaft extension 21 and is further formed with a thrust surface 27 to engage the side face 23.

In the cover member 13, there is press-fit a nonmovable bearing sleeve 28 lined or coated as at 29 to provide a bearing surface for the shaft extension 20. A sealing device 25 is mounted in the cover member 13 to effect a shaft seal with the extension 20.

In accordance with the principles of the present invention, it is contemplated that the cover member be formed as a die cast member or some other form of simple fabrication and thus the cover member 13 includes a flange portion 30, as well as a boss 31 extending axially from the flange 30 and providing a radial wall 32 which is positioned to close the open side of the pumping cavity 18 facing the cover member 13 in the body section 11 of the casing.

A sealing means for engaging the side face of the gears such as the side face 22 is provided between the body section 11 and the cover member 13. As shown, the sealing means comprises a plate form member indicated generally at 33. The plate form member 33 is generally coextensive in area with the wall 32 of the boss 31, thereby to provide a flange portion 34 along the entire inlet side of the pump, which is adapted to be rigidly clamped between the wall 32 and a shoulder 36 formed in the body section 11.

The plate form member 33 extends from the shoulder 36 across the opening or across the pumping cavity 18 to lie adjacent the side faces of the gears such as the side face 22 of the driver gear 19, however, it will be noted that the side of the plate form member 33 on the outlet side of the pump and identified herein by the reference numeral 37, is not restrained by any clamping shoulder, but rather is free to flexibly engage the adjoining side face of the gears.

Furthermore, the plate form member 33 is formed with a pair of shaft openings 38, thereby to pass the bearing sleeves 28 and the shaft extensions of the corresponding gears such as the shaft extension 20 of the driver gear 19.

Immediately adjacent the bearing sleeve 28, the cover member 13 is provided with a notched recess 39 conveniently taking the form of a counterbore in which is received a sealing means such as an O ring sealing member 40 for engaging against the rear face of the plate form member 33. In this regard, it may be noted that the plate form member 33 has a rear face forming a motive surface 41 as well as a front face 42 comprising a sealing surface for engaging against the adjoining side face of the gears, such as the side face 22 of the gear 19.

Outwardly of the sealing means provided by the sealing member 40, the cover member 13 is provided with a recess 43 communicating with the discharge side of the pump so as to receive fluid at pump-generated pressure. Accordingly, the rear face 41 of the plate form member 33 forms one wall of the pressure control recess 43. Thus, the back of the plate 33 is subjected to pump discharge pressure and the plate 33 is flexed against the gear faces to seal at the desired loadings. Since the plate 33 is rigidly clamped on the inlet side of the pump and is free to flex on the outlet side of the pump, it will be evident that improved sealing will be effected on the discharge side of the pump, thereby improving the balanced loading as opposed to the unbalanced forces existing in the pumping cavity 18.

To further enhance the improved balanced loading, it is further contemplated in accordance with the present invention that the plate 33 take the form of a plate 33a, as illustrated in FIGURE 3. In this form of the invention, it will be noted that the plate is varied in thickness to give desired loadings at desired areas of the gear faces. Thus, the variable thickness feature would rigidify the plate 33a at certain areas and cause it to flex more easily at the thinner areas. In the embodiment illustrated, the plate is of a thickness $T_1$ at a point corresponding to the portion of the plate adapted to be clamped against the shoulder 36 and such portion is indicated at 34a. On the other hand, the portion indicated at 37a is shown to be a much thicker thickness, herein referred to at $T_2$. A shaft opening 38a is also shown in the plate 33a and it will be understood that the plate 33a, like the plate 33 includes a sealing face 42a and a motive surface 41a.

Although minor modifications might be suggested by those versed in the art, it should be understood that I wish to embody within the scope of the patent warranted hereon all such modifications as reasonably and properly come within the scope of my contribution to the art.

I claim as my invention:

1. In a pump, a housing having a pumping chamber formed with an inlet and an outlet, rotary fluid displacement means in said chamber for moving fluid from the inlet to the outlet, a flexible plate form member clamped in said housing only at the inlet side of said rotary fluid displacement means, said plate form member having flexible sealing portions providing a front sealing face and extending across and against an adjoining side face of the rotary fluid displacement means, said plate form member being free to flex on the outlet side of the pump, annd a rear motive surface spaced from said sealing face, and means including an adjoining housing wall forming with said plate form member a pressure control recess behind said sealing portions receiving fluid at pump-generated pressure to pressure-load said sealing surface against said side face.

2. In a pump, rotary fluid displacement means having a side face, a housing in which said rotary fluid displacement means are rotated, and a thin plate member in said housing having a front sealing surface engaging said side face and a rear motive surface spaced from an adjoining wall of said housing to form a pressure control recess, said thin plate member including a flange extending outwardly of said sealing surface along the inlet side of the pump and means in said housing forming a clamping shoulder gripping said flange of said plate member only along the inlet side of the pump, said plate member being free to flex on the outlet side of the pump under fluid at pump generated pressure in said pressure control recess.

3. In a gear pump, a gear impeller having a side face, and sealing means for said side face, comprising a plate form member having a flange portion rigidly clamped only on the inlet side of the pump and having sealing portions extending across said side face to form a front sealing face for engaging said side face, the sealing portions of said plate form member on the outlet side of the pump being free to flex subject to fluid at pump-generated pressure, said plate form member being spaced from an adjoining wall of the pump casing to form a pressure control chamber communicating with pump-generated pressure.

4. A gear pump comprising a casing having a pumping cavity formed with an inlet and an outlet, gears in said cavity for moving fluid from the inlet to the outlet and having side faces, gear shafts for said gears extending axially outwardly of said side faces, and a plate form member having an edge along the inlet side only of said pump rigidly clamped in said casing and having sealing portions extending across to the outlet side of the pump, said plate form member having a pair of openings formed therein for passing the gear shafts, said sealing portions being unrestrained and free to flex at the outlet side of the pump, sealing means surrounding each shaft and engaging the rear face of the plate form member, and means forming with said plate form member outwardly of said sealing means a pressure control recess in said housing receiving fluid at pump-generated pressure to flexibly load said plate form member into sealing relation with the adjoining gear side face.

5. A gear pump comprising a housing having a body member and a cover member, said housing having an opening formed at one side thereof providing a pumping cavity including an inlet and an outlet, rotary meshing gears in said cavity moving fluid from the inlet to the outlet, said cover member having a wall closing said opening at said one side, a flexible sealing plate adjacent said wall including a first portion extending outwardly of said opening and clamped rigidly between said cover member and said body member only on the inlet side of the pump, said sealing plate including a second portion extending across said opening and being free to flex relative to said first portion into engagement with an adjoining side face of said gears, and means forming a pressure control recess behind said sealing plate receiving fluid at pump-generated pressure, thereby to pressure-load said second portion of said plate into sealed engagement with the gears.

6. A gear pump comprising a housing having a body member and a cover member, said housing having an opening formed at one side thereof providing a pumping cavity including an inlet and an outlet, rotary meshing gears in said cavity moving fluid from the inlet to the outlet, said cover member having a wall closing said opening at said one side, a flexible sealing plate adjacent said wall including a flange portion extending outwardly of said opening and clamped rigidly between said cover member and said body member only on the inlet side of the pump, said sealing plate having sealing portions extending across said opening and being free to flex relative to said flange portion into engagement with an adjoining side face of said gears, and means forming a pressure control recess behind said sealing plate receiving fluid at pump-generated pressure, thereby to pressure-load said sealing portions of said plate into sealed engagement with the gears, said sealing plate having a pair of openings and said gears having shafts extending through said openings, said pressure control recess being located outwardly of said openings but inwardly of said flange portion.

7. A gear pump comprising a housing having a body member and a cover member, said housing having an opening formed at one side thereof providing a pumping cavity including an inlet and an outlet, rotary meshing gears in said cavity moving fluid from the inlet to the outlet, said cover member having a wall closing said opening at said one side, a flexible sealing plate adjacent said wall including a clamping portion extending outwardly of said opening and clamped rigidly between said cover member and said body member only on the inlet side of the pump, said sealing plate having sealing portions extending across said opening and being free to flex relative to said clamping portion into engagement with an adjoining side face of said gears, and means forming a pressure control recess behind said sealing plate receiving fluid at pump-generated pressure, thereby to pressure-load said plate into sealed engagement with the gears, said sealing plate having a pair of openings and said gears having shafts extending through said openings, said pressure control recess being located outwardly of said openings, and sealing means between said shaft opening and said pressure control recesses.

8. In a pump, rotary fluid displacement means having a side face, a housing in which said rotary fluid displacement means are rotated, and a thin plate member in said housing having a front sealing surface engaging said side face and a rear motive surface spaced from an adjoining wall of said housing to form a pressure control recess and means in said housing forming a clamping shoulder gripping the edge of said plate member along the inlet side of the pump only, said plate member having sealing portions extending away from said gripped edge and being free to flex on the discharge side of the pump under fluid at pump generated pressure in said pressure control recess, said plate member varying in thickness from the inlet to the outlet side of the pump to vary the flexibility of the plate member.

9. In a gear pump, a gear impeller having a side face, and sealing means for said side face comprising a plate form member having one edge thereof rigidly clamped on only the inlet side of the pump and having portions extending across said side face towards the discharge side of the pump to form a front sealing face for engaging said side face, the said portions of said plate form member on the other side of the pump being free to flex on the discharge side subject to fluid at pump-generated pressure, and being of progressively increasing thinness from one side of the pump to the other side of the pump to vary the flexibility thereof and the engagement thereof with said side face.

10. In a pump, rotary fluid displacement means having a side face, and a housing including a thin flexible wall-forming means extending across said side face and having a front sealing face adjacent and engageable with said side face and a rear motive surface subject to fluid at pump-generated pressure, thereby to pressure-load said front sealing face against said side face, means clamping said wall forming means on only the inlet side of the pump, said wall varying in thickness from the inlet side of the pump to the outlet side of the pump to vary its flexibility and give desired loadings at desired areas of said side face.

11. In a pump having a pumping chamber with an inlet and an outlet and rotary fluid displacement means in said chamber for moving fluid from the inlet to the outlet, a sealing and wear plate for engaging the adjoining side face of the rotary fluid displacement means and being of variable thickness, means clamping said plate only on the inlet side of the pump, said plate including thicker rigid portions on said inlet side of the pump and thinner flexible portions on the opposite discharge side of the pump to change the flexibility of the plate in correlation with the unevenly distributed pressure forces in the pump chamber of the pump.

12. In a gear pump, a sealing and wear plate comprising a plate form member for engaging an adjoining side face of the gears and varying in thickness from the inlet to the outlet sides of the pump, and means clamping said member only on the inlet side of the pump thereby varying the flexibility and rigidity of the plate to give desired loadings at desired areas of the gear faces opposite the unevenly distributed pressure forces in the pumping chamber.

References Cited in the file of this patent

UNITED STATES PATENTS

| | | |
|---|---|---|
| 164,147 | Conver | June 8, 1875 |
| 2,702,509 | Garnier | Feb. 22, 1955 |
| 2,772,638 | Nagely | Dec. 4, 1956 |
| 2,793,595 | Lauck | May 28, 1957 |
| 2,809,592 | Miller et al. | Oct. 15, 1957 |
| 2,824,524 | Banker | Feb. 25, 1958 |
| 2,923,248 | Hodgson | Feb. 2, 1960 |

FOREIGN PATENTS

| | | |
|---|---|---|
| 1,105,262 | France | June 29, 1955 |
| 1,121,180 | France | Apr. 30, 1956 |